Oct. 8, 1968 D. E. CROSTON 3,404,659
MACHINE FOR COATING ARTICLES WITH FINELY DIVIDED
PARTICLES, WITH CONVEYORS
Original Filed June 7, 1965 4 Sheets-Sheet 1

INVENTOR
DONALD E. CROSTON
BY
Meyer, Baldwin, Doran & Egan
ATTORNEYS

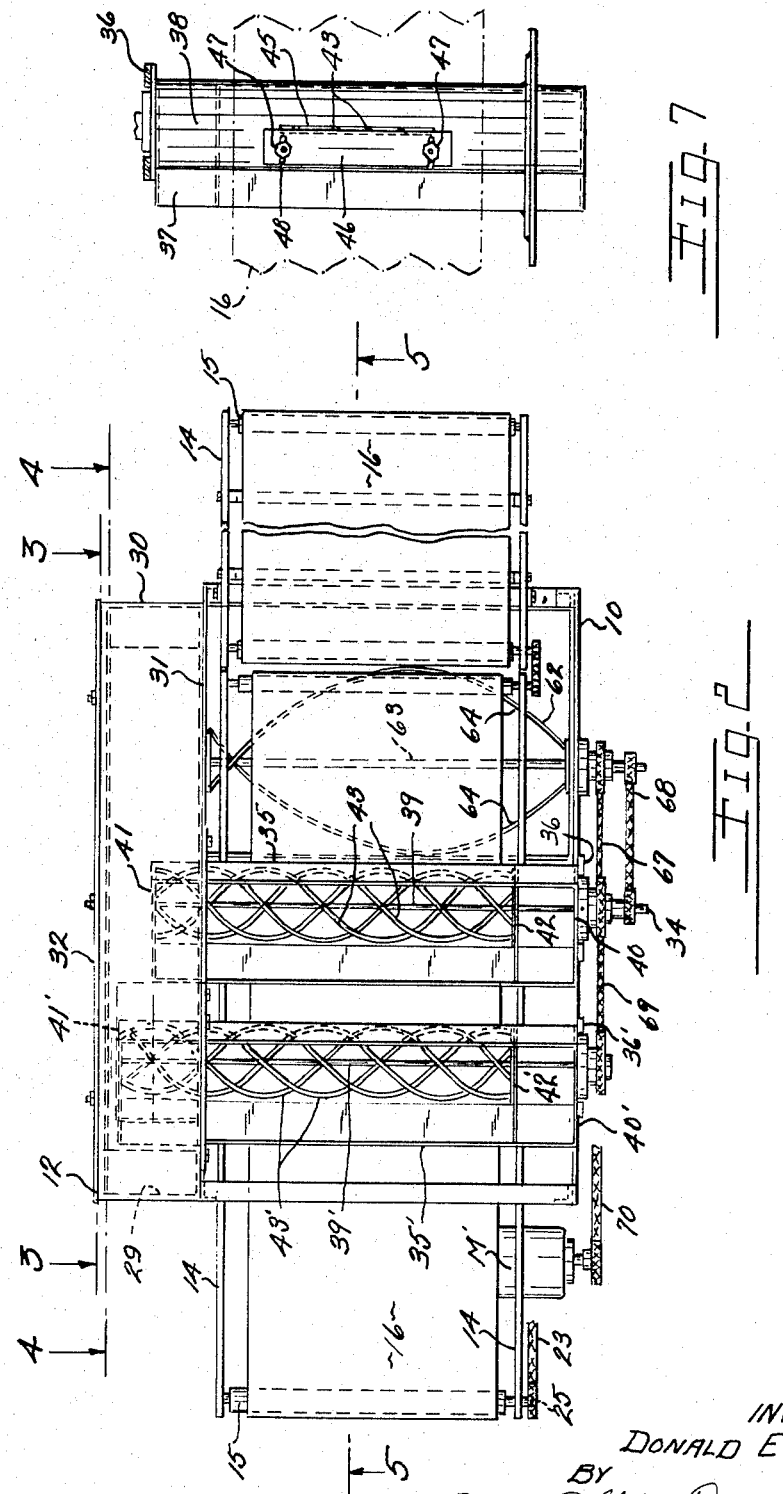

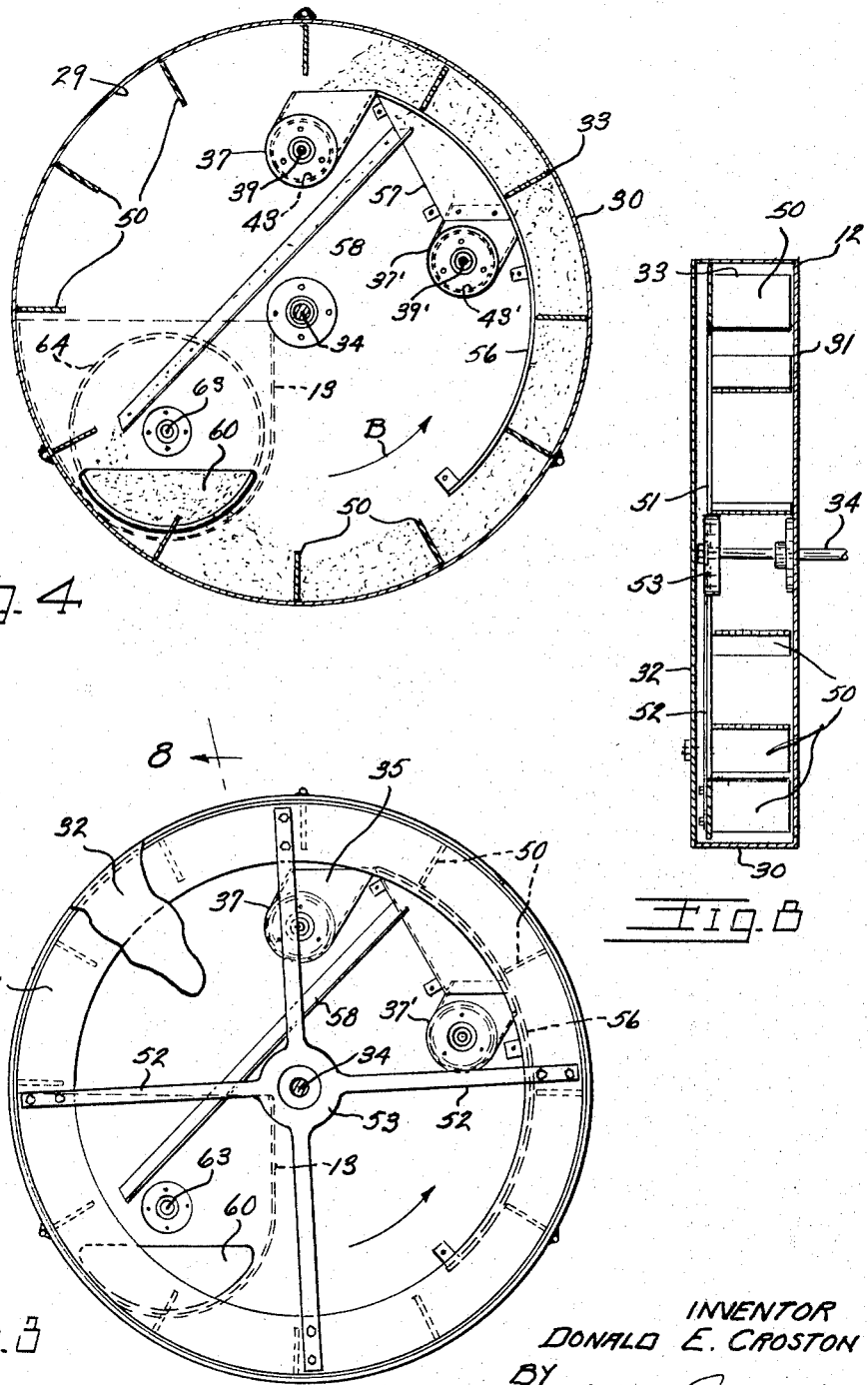

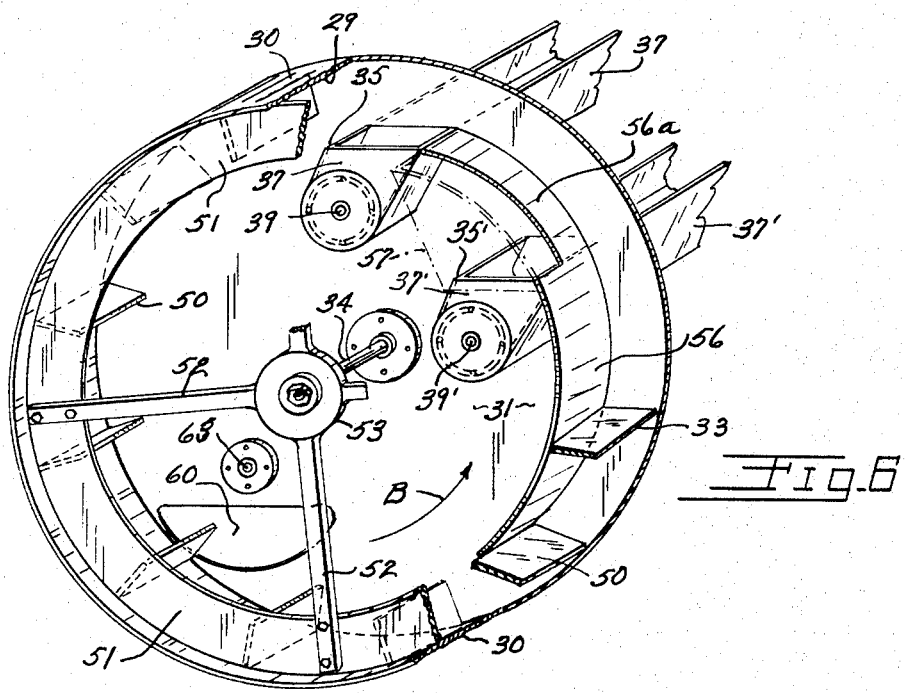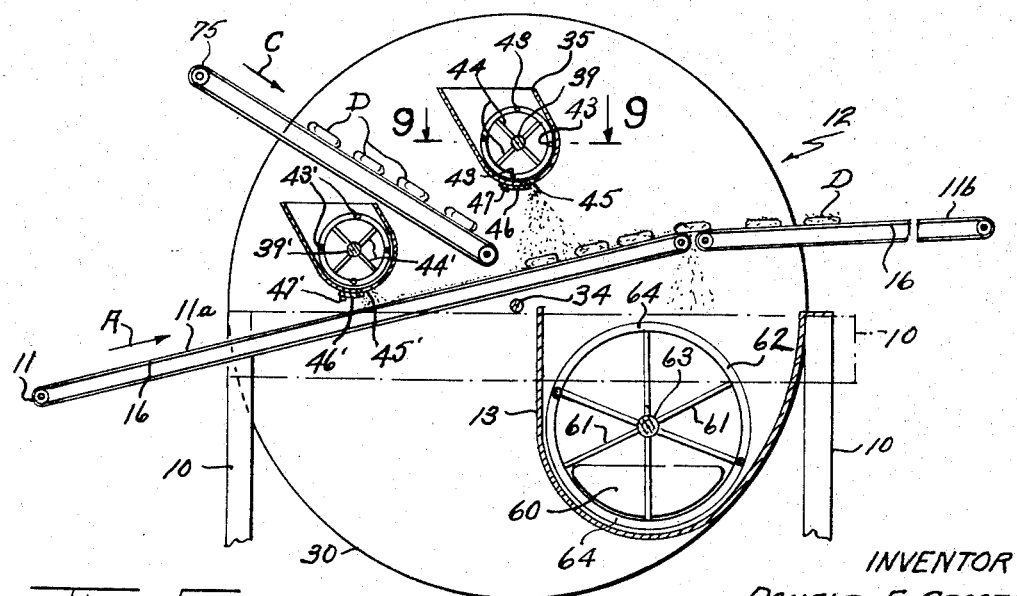

United States Patent Office 3,404,659
Patented Oct. 8, 1968

3,404,659
MACHINE FOR COATING ARTICLES WITH FINELY DIVIDED PARTICLES, WITH CONVEYORS
Donald E. Croston, Sandusky, Ohio, assignor to Sam Stein Associates, Inc., Sandusky, Ohio, a corporation of Ohio
Continuation of application Ser. No. 461,619, June 7, 1965. This application July 31, 1967, Ser. No. 657,428
4 Claims. (Cl. 118—24)

ABSTRACT OF THE DISCLOSURE

Finely powdered particulate material for coating food articles is carried from a low lying supply hopper upwardly on a rotating paddle conveyor and deposited in two particle distributors. These are open troughs each with a slotted discharge opening in the bottom and with a helical wire mixer which wipes over the discharge opening. One distributor drops particulate material on a conveyor belt, after which the food article is placed on top of that material on the belt, after which the second distributor drops particulate material on the upper side of the food article. Excess particulate material is returned to the supply hopper.

---

This application is a continuation of Ser. No. 461,619, now abandoned.

This invention relates to a machine for coating articles with finely divided particles and has for a preferred use the coating of food products with powdered material such as flour and powdered sugar.

An important object of the invention is to provide a machine of the above type adapted for coating both the top and bottom of each article.

Another object is to provide such a machine wherein conveying means are provided for recycling the unused, finely divided coating material.

Still another object is to provide conveyor means for moving the coating material which will prevent clogging of passageways in use thereof.

Yet another object is to provide conveyor means comprising a propelling element made of a plurality of intertwined, helical wires or rods substantially defining a circle in cross section.

Other objects of the invention and the invention itself will be readily understood from the following description of one embodiment of the invention, reference being made throughout to the accompanying drawings.

FIG. 1 of the drawings is a side elevation of the coating machine of this invention.

FIG. 2 is a top plan view of the machine.

FIG. 3 is a side elevation of a paddle wheel conveyor as seen from the line 3—3 of FIG. 2.

FIG. 4 is a section through the paddle wheel conveyor taken along the line 4—4 of FIG. 2.

FIG. 5 is a longitudinal section through the machine taken along the line 5—5 of FIG. 2

FIG. 6 is a perspective view partially broken away of the paddle wheel conveyor of FIG. 3.

FIG. 7 is a section taken along the line 7—7 of FIG. 1.

FIG. 9 is a horizontal section taken along the line 9—9 of FIG. 5.

Figure 1:
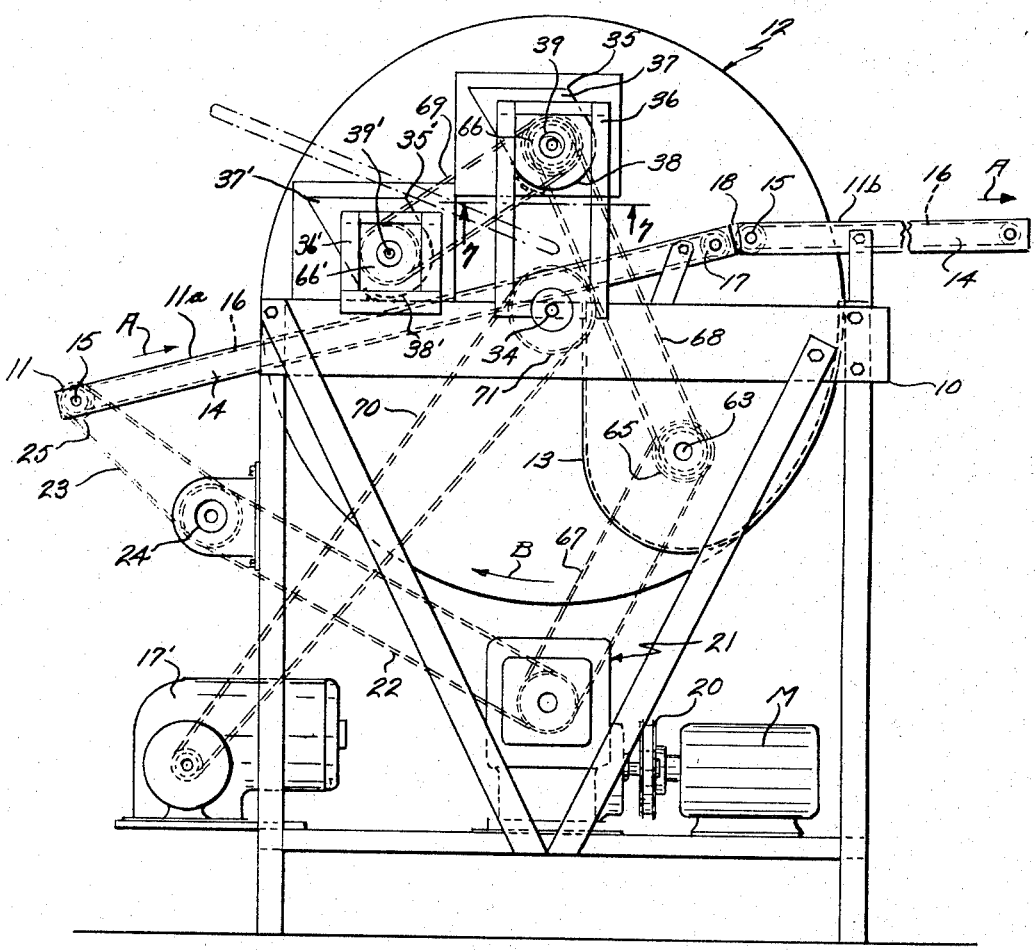

Referring now to the drawings and particularly to FIGS. 1 and 2, the machine of this invention comprises a frame 10 which supports a belt conveyor 11, a paddle-wheel conveyor 12, and a supply hopper 13. The belt conveyor 11 comprises two end-to-end sections, 11a and 11b, each having side rails 14 carrying rollers 15 between end portions thereof. An endless belt 16 connects the rollers 15 carried by each pair of side rails 14, and said sections are connected together in tandem by sprockets 17 and a chain 18 whereby the belts 16 move in unison. The belt conveyor section 11a projects beyond the left-hand end of the machine, as shown in FIG. 1, and is angled upwardly and toward the right to a point adjacent to the end of the other section, 11b. As herein illustrated, the section 11b is substantially horizontal whereby the two sections are obtusely angled relative to each other with a slight opening being provided between the belts of the two sections which said opening is disposed directly over the supply hopper 13.

The endless belts 16 of the conveyor 11 move in the direction of the arrows A, the power source for said belts comprising a motor M suitably mounted adjacent to the bottom of the frame 10. Through a suitable pulley and belt means 20, said motor operates a gear box 21 to which different components of the machine are connected. The belt conveyor 11 is driven off of the gear box 21 through a first belt or chain 22 and a second belt or chain 23 connected by intermediate sprocket means 24. The belt or chain 23 is, in turn, connected to a small sprocket means 25 carried by an end roller 15 of the conveyor section 11a.

As well shown in FIG. 2, the paddle-wheel conveyor 12 is disposed at one side of the frame 10 on a transverse, horizontal axis. Said paddle-wheel conveyor comprises a drumlike housing 30 having an annual peripheral wall 29 of relatively short axial dimension enclosed by a vertical end wall 31, disposed adjacent to the frame 10, and an outer cover plate 32. Inside of the housing 30, the paddle-wheel conveyor 12 carries a paddle wheel 33, as shown in FIGS. 3, 4, 6 and 8, said paddle wheel being rotatable upon a shaft 34 (FIG. 1) carried by the frame 10 in any suitable manner. Particle dispensing means are provided in the form of a pair of elongated helical conveyors 35 and 35' which project through the end wall 31 radially outwardly from the shaft 34 and are disposed across the machine above the conveyor section 11a. The helical conveyor 35 is disposed directly above the shaft 34 and is supported by a suitable weldment or support 36 while the helical conveyor 35' is disposed to the left and below the level of the helical conveyor 35 and is supported by a weldment or support 36'.

The helical conveyors 35 and 35' are generally of like construction with the conveyor 35 being shorter and extending into the housing 30 only about half of the axial dimension of said housing whereas the conveyor 35' extends into said housing substantially the full distance of said axial dimension. Said helical conveyors comprise upwardly open troughs 37 and 37' which are obliquely directed upwardly and toward the left as seen in end view (FIG. 1) and are provided with semicircular bottoms 38 and 38'. The helical conveyors 35 and 35' have propelling elements comprising central shafts 39 and 39' which are respectively suitably journalled at outer and inner end walls 40, 41 and 40', 41'. Intermediate end walls 42 and 42' are spaced inwardly a short distance from the end walls 40 and 40', respectively, and are disposed just outside the adjacent lateral edge of the belt 16 carried by the conveyor section 11a (FIG. 2). Between the inner end walls 41 and 41' and the intermediate end walls 42 and 42', the shafts 39 and 39' carry helical wire members 43 and 43' whose helices have diameters such as to cause them to closely interfit the semicircular bottoms 38 and 38'.

As best shown in FIG. 5, there are four wire members 43 or 43' for each shaft 39 or 39' with the helices being intertwined and so circumferentially spaced that there is no interference therebetween in either conveyor.

Radiating rod supports 44 and 44' are disposed at intervals along the shafts 39 and 39', respectively, said rod supports being welded or otherwise suitably secured at their inner ends to said shafts and at their outer ends to said helical wire members.

The helical conveyors 35 and 35' are adapted to convey finely ground coating material such as powdered sugar from the paddle-wheel conveyor 12 outwardly across the belt conveyor section 11a. The semicircular bottoms 38 and 38' of the troughs 37 and 37', respectively, are provided with elongated slots 45 and 45' which are made adjustable by means of arcuate closure plates 46 and 46'. FIG. 7 shows the closure plate 46 which is adjustable relative to the slot 45 by means of nut and bolt means 47 engaging suitable slots 48. The closure plate 46' is similarly adjustable at the nut and bolt means 47'.

The paddle wheel 33 serves to fill the troughs 37 and 37' with coating material by means of a plurality of radially disposed paddles 50 each of which is carried at one edge by a flat ring 51 disposed in a vertical plane. The ring 51 is carried by spokes 52 radiating from a hub 53. The hub 53 is, in turn, carried by the shaft 34 whereby upon rotation of said shaft, said paddles move around the inner circumference of the annular wall 29. Said paddles have outer edges which are disposed closely adjacent to the inner surface of said annular wall whereby the powdered sugar can be scooped up from the bottom of said housing 30 and conveyed upwardly in the direction of the spiral conveyors 35 and 35'.

Referring now particularly to FIG. 6, the ring 51 and the paddles 50 cairied thereby are caused to rotate in the direction of the arrows B whereby said paddles successively pass over first the helical conveyor 35' and then the helical conveyor 35. A curved baffle 56 extends from a position substantially below and upstream from the helical conveyor 35' upwardly over said conveyor 35' to the edge of the trough 37 of the helical conveyor 35. The baffle 56 is formed on a radius about the axis of the shaft 34 and is spaced from the outer peripheral wall of the annular housing 34 such distance that the inwardly directed edges of the paddles 50 are disposed closely adjacent to or wipe gently across the outer surface of said baffle 56. Said curved baffle is laterally cut away to substantially half its width at the outer end of the trough 37' with the narrower portion of said curved baffle, indicated at 56a, extending on upwardly to the nearest edge of the trough 37. It will be readily seen that powdered sugar picked up by the paddles 50 at the bottom of the housing 30 is conveyed to the right and upwardly between said housing and the curved baffle 56 with a portion of the sugar from each paddle being deposited into the trough 37' and another portion thereof being conveyed on upwardly across the narrower portion 56a to be deposited into the trough 37.

As shown in dotted line in FIG. 6 and in full line in FIGS. 3 and 4, a chute 57 is provided above the trough 37' adjacent to the narrower portion 56a of the curved baffle 56 for the purpose of directing any sugar which falls off of said narrower portion back into the trough 37'. As shown in FIGS. 3 and 4, an elongated, oblique baffle 58 extends from beneath the helical conveyor 35 downwardly in the general direction of the bottom of the housing 30 whereby any sugar spilled or for any reason not entering either of the troughs 37 or 37' is directed back to the bottom of said housing to be reconveyed upwardly. All of the mechanism just described is, of course, enclosed from the outside by the cover plate 32 hereinbefore mentioned.

The powdered sugar or other coating material passes from the supply hopper 13 into the annular housing 30 at a pick-up zone through a half-moon opening 60 in the end wall 31. Said opening 60 is disposed adjacent to the bottom of the hopper 13, as best shown in FIGS. 3 and 4. As each paddle 50 passes the opening 60, a portion of the powdered sugar is moved away from said opening thereby allowing more sugar to enter the housing behind the preceding blade and in front of the succeeding blade.

To prevent clogging of the powdered sugar within the hopper 13 and propel it toward the opening 60, said hopper is provided with a helical mixer 62, as best shown in FIGS. 2 and 5. Said mixer is mounted upon a shaft 63 disposed transversely and parallel with the shaft 34 and comprises two opposed wire members 64 each of which is helically shaped but extends only about one-half of the circumference of the helix as it progresses across the hopper. Said wire members 64 are mounted to the shaft 63 by radially directed rod supports 61 disposed at intervals along said shaft 63 and welded to the shaft and wire members. The helical shape of the wire members 64 urge the powdered sugar toward the opening 60 and keep it loose and flowing.

Referring again to FIG. 1, the shaft 63 of the mixer 62 carries sprocket means 65, the shaft 39 of the helical conveyor 35 carries sprocket means 66, and the shaft 39' of the helical conveyor 35' carries sprocket means 66'. An endless chain 67, driven from the gear box 21, rotates the mixer 62 through the sprocket means 65. An endless chain 68 is driven by the sprocket means 65 and rotates the helical conveyor 35 through the sprocket means 66. Another endless chain 69, in turn, is driven by the sprocket means 66 and rotates the helical conveyor 35' through the sprocket means 66'. The shaft 34 and, therefore, the paddles 50 are rotated by an endless chain 70 driven from a motor M' carried by the frame 10 and driving a sprocket means 71 carried by said shaft 34.

As shown in dotted line in FIG. 1 and in full line in FIG. 5, a second belt conveyor 75 is disposed above the belt conveyor section 11a of the belt conveyor 11. The conveyor 75 is angled obliquely oppositely from that of the conveyor belt section 11a and is disposed between the spiral conveyors 35 and 35'. As illustrated in FIG. 5, the belt conveyor 75 moves in the direction indicated by the arrow C whereby articles, such as doughnuts indicated at D, are conveyed downwardly and toward the right to be dropped onto the conveyor 11 moving in the direction of the arrow A. Thus, the doughnuts D are dropped onto said conveyor 11 downstream from the helical conveyor 35' and upstream from the helical conveyor 35. The helical conveyor 35' continuously deposits a coating of powdered sugar upon the belt 16 of the conveyor section 11a whereby each doughnut D drops onto said coating of powdered sugar and is coated on the bottom thereof. Subsequently, each doughnut D passes under the helical conveyor 35 whereby sugar is deposited on the top thereof. The excess sugar carried by the conveyor section 11a drops off of the end thereof between the sections 11a and 11b and back into the hopper 13 to be recycled to the spiral conveyors 35 and 35'. Therefore, any sugar which is not used in coating the doughnuts D is always returned either directly to the hopper 13 or to the bottom of the housing 30.

From the foregoing, it will be seen that in the coating machine of this invention, there is a continuous movement of the finely divided particles of sugar or the like from the hopper 13 through the opening 60 and into the housing 30 at which point it is picked up by the paddles 50, deposited in the troughs 37 and 37', and deposited upon the doughnuts D or returned again to the hopper.

Figure 8:
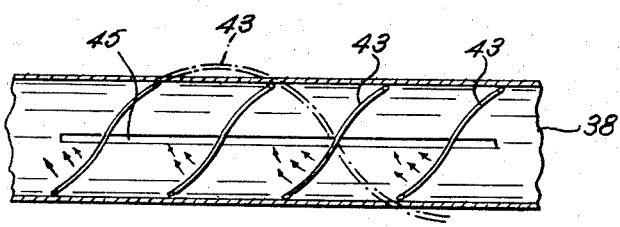
FIG. 8 is a diametric section taken along the line 8—8 of FIG. 3.

FIG. 4 shows in detail the manner in which the coating material is picked up by the paddles 50 and conveyed upwardly and to the right between the outer peripheral wall 29 of the housing 30 and the curved baffle 56. The drawing clearly shows how a portion of the divided particles is deposited in the trough 37' and another portion is deposited in the trough 37, with the baffle 58 reconveying any excess or spillage back to the bottom of the housing 30. FIG. 8 shows the manner in which the blades 50 are closely confined between the ring 51 and the end wall 31 with the working parts of the paddle-wheel conveyor 12 being enclosed behind the cover plate 32 while FIG. 9 illustrates the manner in which the helical wire members 43 (or 43′) wipe diagonally across the slot 45 (or 45′) as the helices turn to effect a constant, gentle flow of the powdered sugar through said slot.

It will be noted that the helical wire members 43 and 43′ not only convey the coating material from the housing 30 outwardly across the conveyor 11 but also stir and mix said coating material to effect a steady even flow and to prevent clogging within the troughs. Known ribbon type conveyors will not feed finely powdered material without clogging. Although the helical conveyors of the present invention are especially adapted for use with such finely divided materials, they may also be used with less finely divided materials such as breading material.

Although the present invention is not limited to exact dimensions, the form of the invention shown in the accompanying drawings illustrates typical workable dimensions in a machine adapted to convey powdered or very finely divided coating material. As herein illustrated, the helices of the mixer are 10″ in diameter and have a 36″ pitch. In the helical conveyors 35 and 35′, the four intertwined helical wire members are spaced 90° apart and define a 3⅝″ diameter. The pitch of the wire members 43 and 43′ is 12″ with the result that each member passes or wipes along the slot 45 or 45′ at an optimum tilt or angle and pushing the powdered material in the same direction. This angle is preferably maintained at from 45° to 55° relative to the slot as viewed in FIG. 9.

It will be understood that many changes in the details of the invention as herein described and illustrated may be made without, however, departing from the spirit thereof or the scope of the appended claims.

What is claimed is:

1. A machine for coating articles with finely divided particles of coating material, said machine comprising a frame; an article conveyor means moving in a generally horizontal direction and carried by said frame; a hopper for coating material disposed below said conveyor means; two particle dispensing means disposed above said conveyor means and spaced from each other in the direction of movement of said conveyor means for depositing coating material at two spaced positions along said conveyor means; a housing carried at one side of said frame adjacent to the ends of said hopper and said dispensing means; means defining an opening in said housing connecting said hopper with said housing whereby coating material from said hopper enters said housing at a pick-up zone; mixing and conveying means carried by said hopper for moving said coating material toward said opening; said particle dispensing means having end portions projecting into said housing at a hgher elevation than said pick-up zone; other mixing and conveying means carried by said particle dispensing means for moving said coating material from said end portions outwardly over said article conveyor means; paddle wheel conveyor means disposed within said housing for conveying said coating material from said pick-up zone at the bottom of said housing to said end portions to supply said particle dispensing means with said coating material; said housing having an annular wall disposed upon an axis transverse to said article conveyor means; said paddle wheel conveyor means comprising a plurality of radially disposed paddles having outer edges disposed closely adjacent to said annular wall; means rotating said paddles about the axis of said housing whereby coating material is conveyed upwardly from said pick-up zone at the bottom of said housing to said end portions of said particle dispensing means; and means disposed above said conveyor means for discharging articles onto said conveyor means between said spaced positions whereby each article is coated on the bottom by coating material deposited upon said conveyor means by one of said particle dispensing means and is then coated on the top by passing under the other of said dispensing means.

2. A machine as set forth in claim 1 including an arcuate baffle mounted within said housing and extending from adjacent said hopper toward the top thereof; said paddles having inner edges disposed closely adjacent to said baffle as they pass between said baffle and said annular wall whereby coating material is carried over said baffle toward the top of said housing; said pair of dispensing means having their end portions disposed radially inwardly from said baffle at two spaced positions along said baffle and adapted to receive coating material therefrom; said baffle having a full-width portion of substantially the same width as said paddles extending only to the first-encountered of said dispensing means and having a relatively narrower portion extending between said pair of dispensing means whereby a portion of said coating material from said paddles is deposited in the first-encountered of said dispensing means and another portion is carried over said narrower portion to the other of said dispensing means.

3. A machine as set forth in claim 1 in which each of the dispensing means include an elongated container having a bottom which is concave upwardly and arcuately formed about a horizontal axis; said container being open at the top to receive said materials; a rotatable shaft carried inside said container parallel with the axis of said arcuate bottom; a mixing and conveying element carried by said shaft; said mixing and conveying element comprising a plurality of intertwined helical wire members defining a circle in cross section and rotatable closely adjacent to said arcuate bottom for conveying the material in one longitudinal direction only in said container; means defining aperture means in said bottom with a free fall of the conveyed material therethrough whereby the material is dispensed therethrough, said mixing and conveying element moving closely over said aperture means; and adjustable closure means carried by said arcuate bottom for setting the opening afforded by said aperture means at any one of several adjusted positions.

4. A dispenser for finely divided material comprising an elongated container having a bottom which is concave upwardly and arcuately formed about a horizontal axis; said container being open at the top to receive said material; a rotatable shaft carried inside said container parallel with the axis of said arcuate bottom; a mixing and conveying element carried by said shaft; said mixing and conveying element comprising a plurality of intertwined helical wire members defining a circle in cross section and rotatable closely adjacent to said arcuate bottom for conveying the material in one longitudinal direction only in said container; there being an elongated discharge slot through said bottom in a longitudinal direction with a free fall of the conveyed material therethrough whereby the material is dispensed therethrough, said mixing and conveying element moving closely over said aperture means; and adjustable closure means carried by said arcuate bottom for setting the width of said slot at any one of several adjusted positions.

References Cited

UNITED STATES PATENTS

| | | | |
|---|---|---|---|
| 1,558,580 | 10/1925 | Bishop | 118—308 X |
| 2,300,396 | 11/1942 | Bookidis | 118—16 |
| 2,583,608 | 1/1952 | Smith | 222—412 X |
| 2,625,905 | 1/1953 | Richards | 118—312 X |
| 2,731,942 | 1/1956 | Anderson | 118—312 X |
| 2,782,754 | 2/1957 | Bookidis | 118—16 X |
| 3,041,738 | 7/1962 | Ray | 259—9 X |
| 3,138,167 | 6/1964 | Fisher | 259—9 X |

CHARLES A. WILLMUTH, *Primary Examiner.*

JOHN P. McINTOSH, *Assistant Examiner.*